Nov. 20, 1951  H. KLUGLEIN ET AL  2,575,387
PARACHUTE
Filed Jan. 29, 1951  2 SHEETS—SHEET 1

INVENTORS
Helmuth Kluglein
and Theobald Kluglein
BY
Munn, Liddy & Glaccum
Attorneys Nov. 20, 1951  H. KLUGLEIN ET AL  2,575,387
PARACHUTE
Filed Jan. 29, 1951  2 SHEETS—SHEET 2
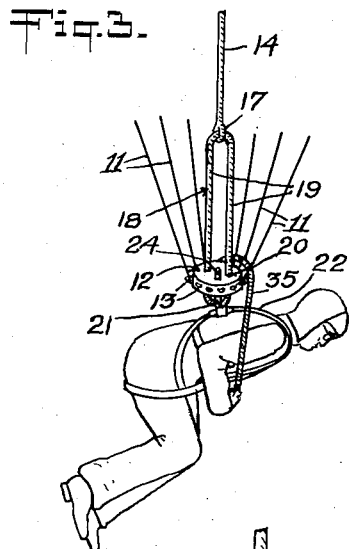
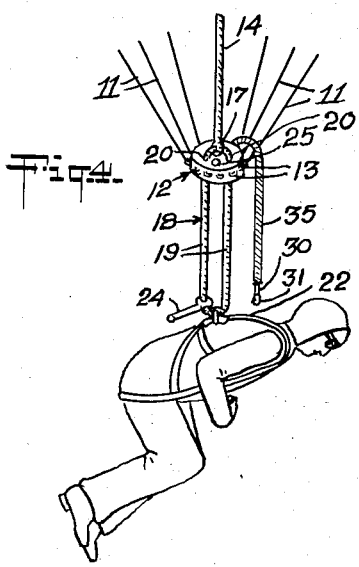
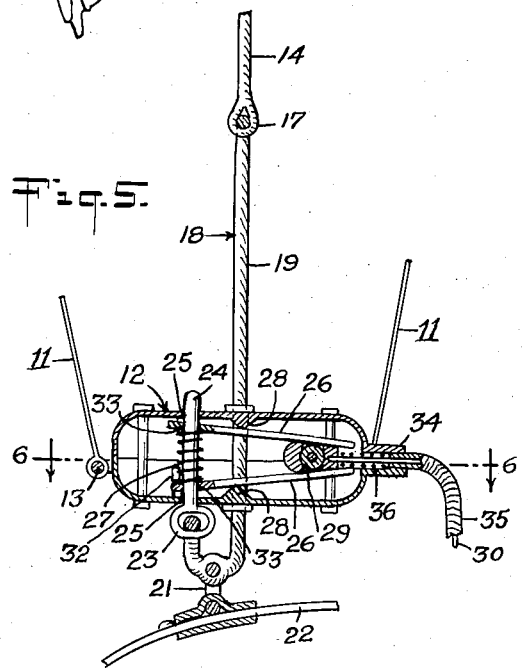
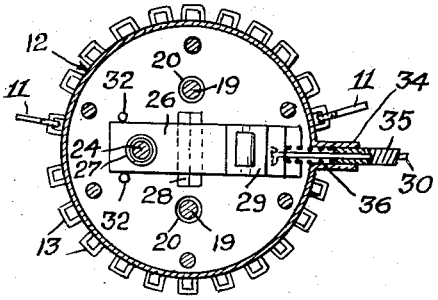
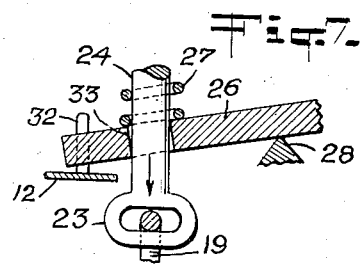
INVENTORS
Helmuth Kluglein
and Theobald Kluglein
BY
Munn, Liddy & Glaccum
Attorneys Patented Nov. 20, 1951

2,575,387

UNITED STATES PATENT OFFICE 2,575,387

PARACHUTE

Helmuth Kluglein and Theobald Kluglein,
Valley Stream, N. Y.

Application January 29, 1951, Serial No. 208,364

3 Claims. (Cl. 244—152)

This invention relates to a parachute of type used by airborne troops and members of the crew of aircraft.

The principal object of the present invention is the provision of a parachute embodying improvements, whereby the parachutist may decelerate the descent and so reduce the hazard in landing.

The nature of the invention and its distinguishing features and advantages will appear when the following specification is read in conjunction with the accompanying drawing, in which Fig. 1 is a vertical sectional view of a parachute embodying the features of the present invention, the canopy being inflated for the descent of the parachute with its load.

Fig. 3 is a view showing certain features on an enlarged scale in which the weight of the parachutist is supported by the main set of shroud lines.

Fig. 4 is a view similar to Fig. 3, but showing the weight of the parachutist transferred to the rope which is connected with the center of the canopy to decelerate the descent of the parachute.

Fig. 5 is an enlarged vertical sectional view of the slider and associated parts.

Fig. 6 is a sectional view taken on the line 6—6 of Fig. 5.

Fig. 7 is a detail sectional view.

Figure 2:
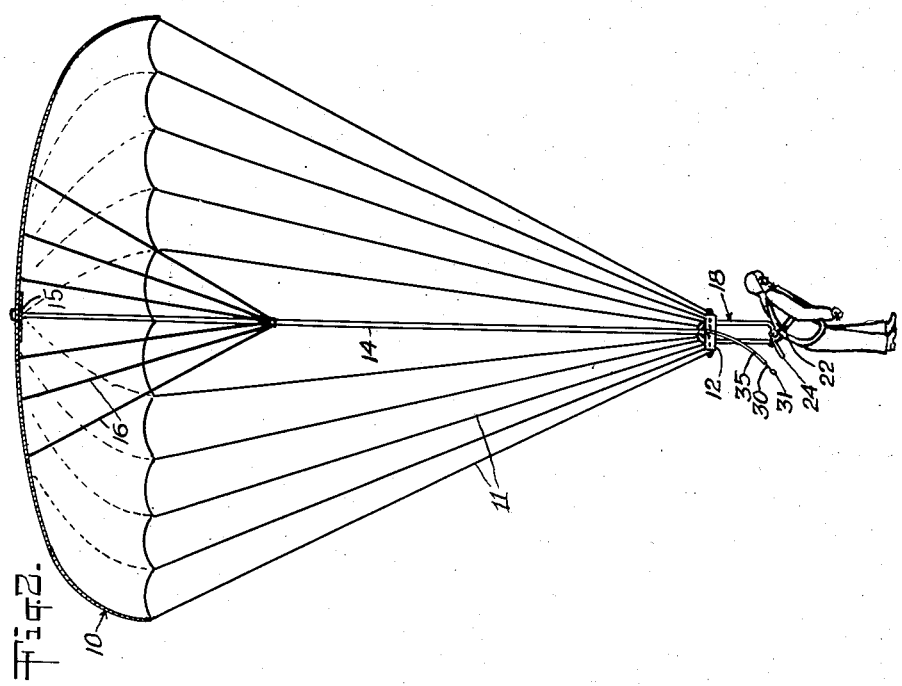
Fig. 2 is a view similar to Fig. 1, but showing the load transferred to the center of the canopy, and the inflated canopy deformed to decelerate the descent of the parachute.

In accordance with this invention, the parachute has a conventional canopy 10 with a set of main shrouds 11 connected with its peripheral edge. The lower ends of the lines 11 are secured to a slider 12 by means of eyelets 13 on the slider 12, the lines 11 being tied to said eyelets in any suitable manner. The slider 12 consists of a circular hollow body or housing made in sections secured to each other by bolts. A length of rope 14 has the upper end thereof secured to the canopy 10 at the center as at 15, so as to hang downwardly from the canopy when the latter is open in the air. A set of short extra lines 16 is secured to the rope 14 and the canopy 10 to strengthen the securement of the rope 14 to the canopy.

On the lower end of the rope 14 there is an eyelet 17 which receives one bight of a rope loop 18 providing leads 19 which pass downwardly and loosely through openings 20 formed in the slider 12. The leads 19 are secured by a ring 21 to a back portion of a conventional harness 22 for the parachutist. The other bight of the loop 18 is received in an eyelet 23 on one of a sustaining metal rod 24. It will now be understood that the slider 12 has limited sliding movement up or down along the leads 19; and that the weight of the parachutist may be carried by the rope 14 as connected with the canopy 10, and when the harness is released from the slider 12.

Holding and releasing means carried by the slider 12 is adapted to hold the rod and is manually operable to release the rod. Alined openings 25 in the slider 12 accommodate the rod disposed upright in its sustaining position. The holding and releasing means comprises grippers 26, a helical spring 27 fulcrums 28, and a wedge shape roller cam 29 having a steel pull wire 30 with a knob 31. The grippers 26 consist of similar metal bars. They are arranged one above the other within the slider 12 and are kept from lateral movement by pins 32 on the slider body. Each gripper has a hole 33 to receive the rod. The spring 27 is disposed between the grippers to force them into a gripping engagement with the rod 24, when the latter is in the sustaining position extending through the spring 27 and the holes 30. The fulcrums 28 are formed on the body of the slider to cooperate with the grippers respectively. The cam 29 is arranged between the grippers 26 which bear a converging relation thereto by reason of the tension of the spring 27 and the disposition of the fulcrums 28. The wire extends through a guide 34 on the body of the slider, and also extends through a flexible sheath 35 having one end connected with the guide, and the knob 31 being exposed at the other end of the sheath. The wire 30 extends through a helical spring 36, which is interposed between the cam 29 and the adjacent end of the sheath 35. The spring 36 reacts to return the cam 29 to enable the spring 27 to force the grippers into biting or gripping engagement with the rod 24.

Figure 1:
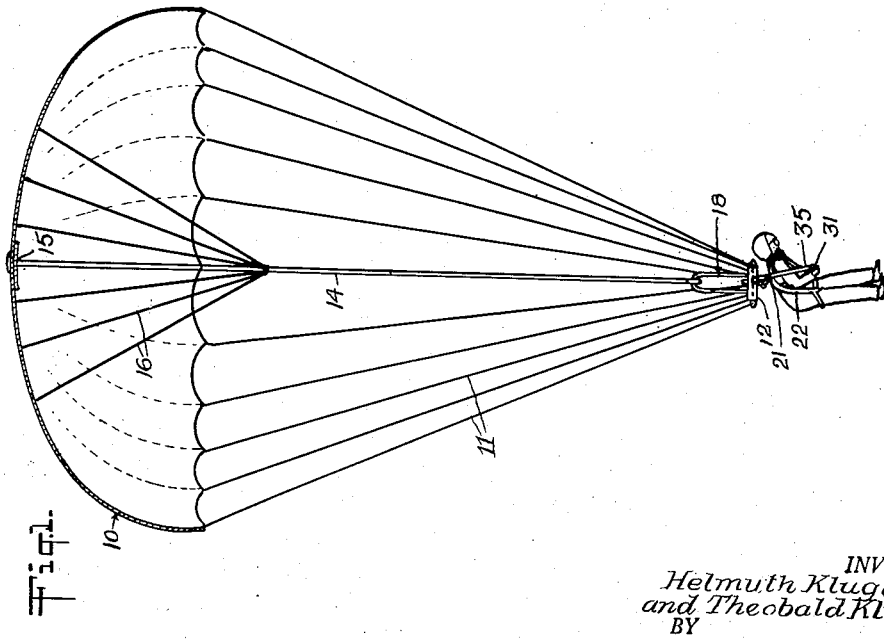

From the foregoing it will be understood that when the parachute descends through the air with the parachutist sustained in the harness 22 coupled to the slider 12 by the gripped rod 24, and with the canopy 10 fully inflated or open, the rope 14 will hang down substantially free of the load. The load consisting of the weight of the parachutist, plus the weight of the slider 12 and parts carried thereby will be on the peripheral edge of the canopy 10 through the shroud lines 11. The slider 12 will be at the lower end of the loop 18, as indicated in Figures 1 and 3. At a chosen elevation above the ground the parachutist pulls on the knob 13, and through the intervention of the wire 30 and the cam 29 causes the grippers 26 to rock on the fulcrums 28 against the compression of the spring 27. The grippers 26 are caused to rock into releasing positions in which they will be parallel to each other, thereby releasing the rod 24. This instantly results in the weight of the parachutist being transferred to the rope 14 by reason of the loop 18 which is to be considered a part of the rope. When the rod 24 is released the slider 12 is drawn upwardly along the leads 19 until stopped by the upper end of the loop 18 and eyelet 17. The upward movement of the slider 12 is caused by the momentarily freed peripheral edge portion of the canopy 10 by reason of the upward strain on the shroud lines 11 everted thereon by said edge portion of the canopy. As a consequence, the canopy will be deformed, or in other words, the canopy will be caused to flatten a predetermined degree until stopped by the engagement of the slider 12 with the upper end of the loop 18. In the flattened condition the canopy has a spread wider than its normal spread, thereby increasing the retarding effect of the canopy. As a result, the descent of the parachute will be decelerated to a speed which is calculated to minimize the hazard in landing or reaching the ground.

It will be understood that the improvements set forth present no difficulties in packing the parachute to be ready for use according to known practice.

It is to be understood that the invention is not restricted to the details above described, but includes all constructions and modifications coming within the scope of the appended claims.

We claim:

1. A parachute comprising the combination of a canopy having a set of shroud lines connected with its peripheral edge, a rope having its upper end connected with the canopy at the center thereof so as to hang downwardly when the canopy is open in the air, said rope having a loop on its lower end, a load carrier secured to the lower end of the loop, and a device comprising a slider housing connected with the lower ends of the shroud lines and slidably engaged with said loop, and manually operable means on the housing connected with the loop for releasably coupling the rope and housing, said rope when uncoupled from the housing enabling deformation of the canopy so as to decelerate the descent of the parachute.

2. A parachute comprising the combination of a canopy having a set of shroud lines connected with the peripheral edge thereof, a rope connected with the center of the canopy to hang downwardly therefrom when the canopy is open and in the air, a load carrier connected with the rope near its lower end, a slider part connected with the lower ends of the shroud lines and slidable up or down along the rope, means on the rope limiting the up movement of the slider part, a releasable part connected to the lower end of the rope, and means carried by the slider part to secure the releasable part thereto or to release it therefrom, said releasable part when released and under the weight of the load enabling the slider part to slide upwardly removing the strain on the shroud lines, so that the canopy may spread and cause deceleration in the descent of the parachute.

3. A parachute as set forth in claim 2, wherein said last means includes a manually operable member to operate said means for the stated purposes.

HELMUTH KLUGLEIN.
THEOBALD KLUGLEIN.

REFERENCES CITED

The following references are of record in the file of this patent:

UNITED STATES PATENTS

| Number | Name | Date |
| --- | --- | --- |
| 1,378,198 | Smith | May 17, 1921 |
| 2,517,488 | Horning | Aug. 1, 1950 |